United States Patent [19]

Shedleski

[11] Patent Number: 4,958,978
[45] Date of Patent: Sep. 25, 1990

[54] ARTICULATED DUMPING VEHICLE

[75] Inventor: Joseph Shedleski, Levittown, Pa.

[73] Assignee: George E. Wilkinson, Bensalem, Pa.

[21] Appl. No.: 243,475

[22] Filed: Sep. 12, 1988

[51] Int. Cl.$^5$ .............................................. B60P 1/14
[52] U.S. Cl. .................................. 414/483; 280/433; 280/789; 298/11; 298/19 V; 414/484
[58] Field of Search ............... 414/469, 476, 480, 494, 414/482–484, 498, 500, 538, 537; 298/11, 19 V, 21 V; 280/433, 462, 789

[56] References Cited

U.S. PATENT DOCUMENTS

| | | | |
|---|---|---|---|
| 647,284 | 4/1900 | Wetmore | 298/15 |
| 986,604 | 3/1911 | Stuckwisch | 298/20 R |
| 1,442,769 | 1/1923 | Jackson et al. | 414/480 |
| 2,517,933 | 8/1950 | Schonrock | 298/19 V |
| 2,696,928 | 12/1954 | Faircloth et al. | 414/469 |
| 2,717,707 | 9/1955 | Martin | 298/21 V |
| 3,406,852 | 10/1968 | Winckler | 414/483 |
| 3,618,801 | 11/1971 | Blanchard | 414/483 |
| 3,934,740 | 1/1976 | Rumell | 414/484 |
| 3,945,521 | 3/1976 | Decker | 414/483 |
| 4,130,211 | 12/1978 | Abascal | 414/484 X |
| 4,133,440 | 1/1979 | Heidrick, Jr. | 414/483 |
| 4,222,698 | 9/1980 | Boelter | 414/482 X |
| 4,243,353 | 1/1981 | Reed | 414/483 X |
| 4,318,658 | 3/1982 | McIntyre | 414/480 |
| 4,391,562 | 7/1983 | Hetzner | 414/483 |
| 4,417,841 | 11/1983 | Chadwick | 414/483 X |
| 4,630,991 | 12/1986 | Landoll et al. | 414/480 X |
| 4,746,261 | 5/1988 | Landoll et al. | 414/494 X |
| 4,801,153 | 1/1989 | Wilson | 414/483 X |

FOREIGN PATENT DOCUMENTS

| | | | |
|---|---|---|---|
| 2360825 | 6/1975 | Fed. Rep. of Germany | 414/469 |
| 363689 | 6/1906 | France . | |
| 3941 | of 1900 | United Kingdom . | |
| 1594063 | 7/1981 | United Kingdom . | |

Primary Examiner—David A. Bucci
Attorney, Agent, or Firm—Eckert Seamans Cherin & Mellot

[57] ABSTRACT

The trailer chassis of a tractor-trailer is provided with a dumping apparatus for interchangeable shipping containers, operable to dump the contents of the container or to unload the container itself, and optionally to reload containers onto the chassis. The chassis is divided into fore and aft sections articulated on a horizontal axis at a knuckle which will bend only in a direction causing the chassis to form a hump. The knuckle is located forward of the center of gravity of the container, whereby the container remains on the aft section during dumping. A pivotable king pin plate is provided between the fore section of the trailer chassis and the tractor, avoiding stress on the king pin assembly when inclined. Vertical pins are preferably provided at each corner of the trailer chassis, the rear pins being controllably retractable for releasing the shipping container if the container itself is to be unloaded from the chassis. A winch or hydraulic ram is provided for forcing the chassis to assume a humped orientation, and a further winch or hydraulic ram can be provided for loading a container onto the chassis in a procedure substantially the reverse of the unloading procedure, the further winch effectively holding the container while the chassis is backed under it.

10 Claims, 4 Drawing Sheets

FIG. 7

ARTICULATED DUMPING VEHICLE

BACKGROUND OF THE INVENTION

1. Field of the Invention

This invention relates to the fields of dumping vehicles and handling devices for various containers carried on dumping vehicle chassis. In particular, the invention is a trailer for a tractor/trailer configuration adapted to dump the contents of containers as well as to unload and re-load the containers themselves onto and off of the chassis.

2. Prior Art

Vehicle chassis are known in which a container or a platform permanently attached to the chassis can be inclined for dumping. In U.S. Pat. No. 986,604 to Stuckwisch, a two-axle wagon has a suspension which is adapted to fold under a box for a load, at a fulcrum forward of the load's center of gravity, causing the wagon to dump to the rear. U.S Pat. No. 647,284 to Wetmore also discloses a dumping arrangement wherein the axles of a wagon are displaceable to approach one another during dumping; however, this is done by a slide mount for one axle and not by means of a pivoting knuckle at a more or less central portion in the chassis.

British Patent No. 1,594,063 to Lloyd et al, teaches a trailer for small garden tractors and the like, having two frames pivotably attached to one another at a pivot point above the chassis and above the load area. By manipulating a draw bar connected to the pivoting linkage, the user causes the load-carrying chassis to pivot, dumping the contents. U.S. Pat. No. 4,417,841 to Chadwick teaches a complex dumping vehicle having a plurality of extendable cylinders that tilt a load bed section relative to a carrying bed section, the carrying bed section having articulated means that become angularly displaced in the dumping process.

The foregoing references teach various aspects of dumping. The present invention is concerned not only with dumping, but also with applying the technology of dumping to discrete standardized containers such as flat beds, tanks, bulk material containers and the like, which are attachable to a vehicle chassis via standardized connectors located at predetermined positions. The invention is especially useful for shipping containers of the type identified in the art as "containerized freight" containers. These containers, which are variously described as freight containers, cargo containers and intermodal containers, can be loaded and sealed, the cargo being protected from origin to destination. The containers are large heavy-duty boxes in standard lengths, which normally occupy the entire area defined by the chassis of a tractor trailer. The "chassis" itself is simply a frame (excluding floor, sides and roof) carried on wheels and having locking devices for securing and transporting a container as a wheeled vehicle. The containers can be transferred between trucks, railroad cars and ships using special purpose lifting and transfer equipment, and container securing devices, which have evolved to engage the containers by their corners. For mounting the shipping containers on a container chassis of a tractor trailer, the four lower corners of the container are provided with reinforced receptacles for mating with fixing pins mounted on the rigid trailer chassis, the pins protruding vertically from the load bed defined by the chassis. In transferring the shipping container to the chassis, transfer equipment which may have lifted and transferred a container, for example from a ship, a railroad car or another truck, aligns the container with the fixing pins on the chassis and simply lowers the container into place, thereby fixing the container against horizontal displacement relative to the chassis. It is possible to add horizontally operable locking means to the vertical pins, for example by means of a twist-lock arrangement whereby an asymmetrical locking pin head is twisted in a complementary hole in the container, and thereby ensure that the container also remains vertically fixed on the chassis due to the pins even if the chassis is upset. Twist lock fixing pins are known with pneumatic controls for twisting the pins to lock or unlock the container. The pins are relatively long and substantial and hold the container against any horizontal displacement on the chassis during jostling encountered in over-the-road travel.

A large number of these discrete containerized freight shipping containers have been produced. The containers are easily manipulated using the specialized transfer machinery adapted for engaging them, but such transfer machinery is so large and specialized that it is only feasible where a large number of containers will be transferred, for example at shipping ports served by railroad. The transfer equipment is not generally available to small scale or infrequent users of the shipping containers. While it is possible to employ general purpose lifting and transfer devices to the containers (e.g., construction cranes, large forklift trucks, etc.), this is cumbersome and even these general purpose devices become large and expensive when designed with the typical hydraulic machinery and high capacity load-bearing equipment required to handle the large and heavy loads of full shipping containers. As a result, use of the containers has been limited apart from overseas shipping and incidental transport to their ultimate destination. A large number of standardized shipping containers accumulate unused at shipping ports or used as stationary storage enclosures, even though these containers are structurally sound and fully capable of use for transporting goods and materials. It is simply not cost effective for the owners of shipping containers or the small or infrequent terminals which could use them, to invest in large capacity equipment which is economically feasible in connection with large transfer ports handling thousands of containers over a given time period but not where only a few containers are likely to be handled in the same time.

The same sort of mountings used for "containerized freight" boxes are also used to adapt standard chassis to standard containers of other types, also attached to the chassis via pins. Accordingly, the description of "containers" herein also applies to containers which are open at the end or top, open at all the sides (i.e., a platform or flat-bed), adapted for fluid or bulk-pourable loads (i.e., tanks), and the like. As appropriate to their loads, the containers may be steel, aluminum, fiberglass-reinforced plywood ("FRP") or combinations of such materials. All these types of containers have been standardized and thus made interchangeably fittable to a standardized chassis.

There is a need to facilitate loading and unloading all forms of containers and/or contents of the containers, using equipment that is readily available and does not involve a great deal of expense, being inherently inexpensive, and capable of productive uses other than simply loading, carrying and unloading particular types of containers.

Trailer chassis for tractor/trailer configurations in use for carrying standardized containers are relatively uncomplicated. A standard king pin assembly for articulating the chassis to a motorized tractor includes a large pin (the "king pin") protruding vertically downward from one end of the trailer chassis. The king pin engages in a king pin-receiving frame on a rear deck of the tractor chassis. One or two four-wheel tire axles are located at the rear of the trailer chassis, and means can be provided on the trailer chassis for displacing the wheel axles forward and backward along the chassis to accommodate a particular load rating. The structural components of known trailer chassis are rigid beams and cross members which can be angle stock, channels, I-beams or the like. Supplemental supporting feet are located toward the front of the trailer chassis and can be manually extended such that the trailer will support itself apart from the tractor. The chassis includes means for electrical wiring for lights and the like, and conduits for pneumatic controls, especially for the rear brakes. In other respects, the typical trailer for carrying standardized shipping containers is simply a frame-work of steel beams and cross-members, with upwardly-protruding fixing pins for mating with the corner sections of the container.

The present invention revises the known container-carrying trailer chassis (or possibly front-wheel-drive truck chassis with fixed bed) to enable dumping the contents of any form of container through rear openings therein, for example through doors in an end wall of the container, and also concerns providing means for loading and unloading whole containers of any of the standardized types on the chassis, without a large transfer apparatus or heavy duty crane or lift adapted to engage the containers for transfer. Instead, according to the invention the containers are loaded and unloaded or dumped primarily with the assistance of gravity and inclined planes produced by a pivoting knuckle-like arrangement articulating the otherwise-rigid trailer chassis and controllably causing the chassis to assume a centrally humped configuration at the knuckle. The knuckle is placed forward of the container center of gravity such that the container is carried along with a rear section of the chassis, which inclines to the rear, and thus enabling either unloading of contents (the container being retained on the chassis via its fixing pins when tilted), or unloading or re-loading of the container itself by sliding the whole container off to the rear or back on from the rear (the fixing pins being retracted). The invention thus opens the door for small scale container users because all the necessary transfer apparatus is included in the trailer chassis. Currently unused shipping containers can thus be put into service, exploiting the benefits of the shipping containers apart from expensive transfer equipment (which of course can still be used where available). Trailer chassis are more practically capable of use with different forms of containers, e.g., flat beds, contoured beds, stakes, liquid tanks, bulk tanks and boxes with or without all their walls. This is achieved without re-manufacturing the chassis or container for each change and without difficult container transferring steps using load carrying equipment. Nor does the capability add substantially to the cost of a container-carrying chassis.

Of course the invention can be applied to new chassis construction or existing chassis can be modified. Inasmuch as existing chassis have the rigid components needed for the front and rear portions of the chassis to be articulated, adapting an existing chassis to the invention involves inserting a knuckle, pivotable king pin plate and drive means. The drive means can be varied as needed for adequate capacity, using an electric winch or a hydraulic winch with a block and pulley system, or using one or two hydraulic retracting rams.

For true general purpose applicability, the chassis can include fixing pins spaced or dimensioned for different types and lengths of shipping containers. The containers, for example are standard in lengths of twenty, thirty-five and forty feet. While the invention is preferably embodied to include an electrical winch driven system for driving the trailer chassis to incline around its knuckle, the user can if desired choose a hydraulic pump "wet line" system or modify an electric winch system after initial manufacture.

SUMMARY OF THE INVENTION

It is an object of the invention to provide an inexpensive loading, unloading and dumping modification to a container-carrying truck chassis and thereby to bring the practical benefits of standardized containers to facilities whose volume does not justify investment in heavy-duty transfer equipment. These practical benefits will also accrue to facilities who do have the equipment in that the invention will free the equipment for its most productive uses.

It is another object of the invention to provide a dumping trailer chassis for articulated tractor/trailer vehicles carrying interchangeable standardized containers wherein a minimum of stress is applied to the tractor, and in particular to the king pin assembly of the tractor, during loading, unloading and dumping of the containers, whereby the tractor can move the trailer forward or backward to assist in such operations.

It is a further object of the invention to optimize durability and cost in large capacity but relatively light duty container handling equipment.

These and other objects are accomplished by a truck chassis or the trailer chassis of a tractor-trailer combination, provided with a dumping apparatus for interchangeable containers, operable to incline and dump the contents of the container or to release and unload the container itself. Optionally, containers can be reloaded onto the chassis as well. The chassis is divided into fore and aft sections articulated on a horizontal axis at a knuckle which will bend only in a direction causing the chassis to form an upward hump at the knuckle. The knuckle is located forward of the center of gravity of the container, whereby gravity keeps the container on the aft section during dumping. In the tractor/trailer embodiment, a pivotable king pin plate is provided between the fore section of the trailer chassis and the tractor, avoiding stress on the king pin assembly during dumping, unloading or reloading. Vertical fixing pins are preferably provided at each corner of the load bed on the trailer chassis, the rear fixing pins being controllably retractable for releasing the container if the container itself is to be moved onto or off of the chassis. A winch with a block and tackle connection or a hydraulic ram connected between the articulated chassis sections forces the chassis to assume a humped orientation, and a further winch or ram can be provided for reloading a container onto the chassis in a procedure substantially the reverse of the unloading procedure, the further winch effectively holding the container while the chassis is backed under it.

BRIEF DESCRIPTION OF THE DRAWINGS

There are shown in the drawings the embodiments that are presently preferred. It should be understood that the invention is not limited to the arrangements and instrumentalities shown in the drawings and is capable of embodiment in other groupings of parts, subassemblies and the like.

DETAILED DESCRIPTION OF THE PREFERRED EMBODIMENTS

Figure 1:
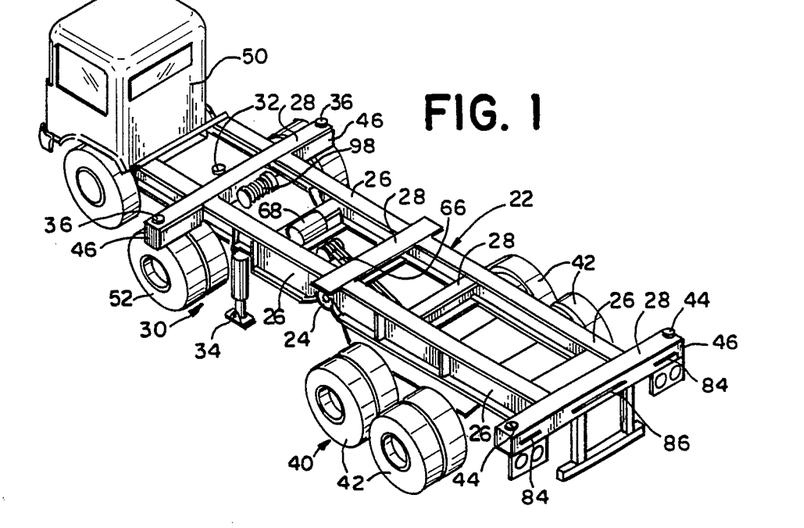
FIG. 1 is a perspective view of the vehicle of the invention, embodied as a tractor/trailer configuration and shown aligned for transport.
Figure 2:
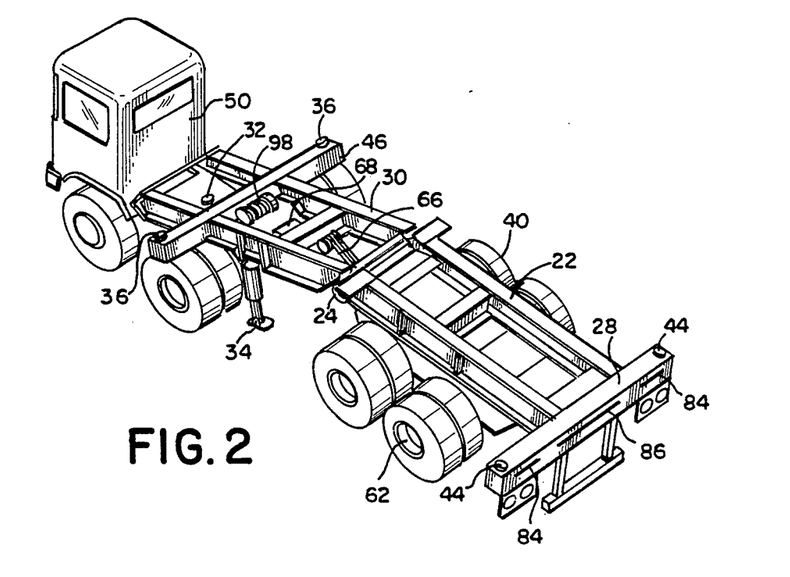
FIG. 2 is a perspective view corresponding to FIG. 1, with the chassis sections inclined around the intermediate knuckle, i.e., in the dumping mode.
Figure 3:
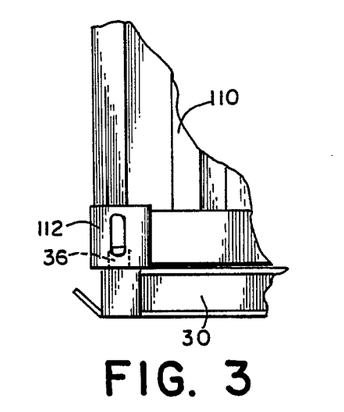
FIG. 3 is a partial elevation view showing engagement between the chassis fixing pins and the container.
Figure 4:
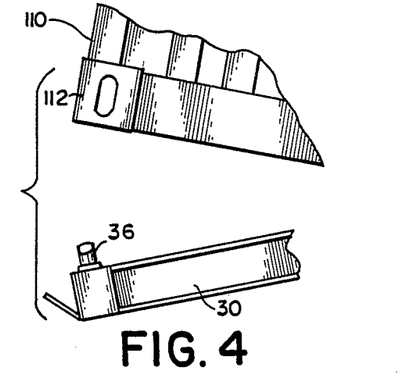
FIG. 4 is a side elevation view corresponding to FIG. 3, with the fore fixing pins clear of the container due to tilting of the trailer chassis sections.

FIGS. 1 and 2 illustrate the invention as applied to a tractor/trailer configuration, with a chassis 22 articulated to a truck tractor 50, by a king pin assembly 32 which will be explained more fully hereinafter. The chassis 22 comprises a plurality of beam members 26 and cross members 28 which define a rigid forward chassis part 30 and a rigid rearward chassis part 40, articulated to one another along a horizontal axis defined by knuckle 24 disposed between the fore section 30 and the aft section 40. The knuckle 24 is placed sufficiently forward on chassis 22 that the knuckle will be forward of the center of gravity of the load to be placed on the chassis, namely a standardized container such as a box, tank or platform, and whatever the container carries. For shipping containers carrying bulk material (presumably spread evenly in the container), the knuckle 24 can be just forward of the center of gravity. Where the container may be loaded unevenly, for example with more weight placed forward, the knuckle can be placed well forward of the chassis midpoint. In any event, the chassis is dimensioned such that the fore and aft sections 30, 40 each pivot downwardly from knuckle 24, up to an adequate angle for gravity to overcome friction holding the container contents or the container itself in place. For example the aft section 40 can assume a maximum angle of fifteen to thirty-five degrees relative to horizontal at maximum tilt. The angle of maximum tilt is defined by stop plates that define abutting edges of the fore and aft sections, which plates come into contact below the knuckle at maximum tilt and above the knuckle at zero tilt (i.e., alignment). According to the presently preferred embodiment, the knuckle is placed forward of the center line of the container by about ten to twenty percent of the container length. By placing the knuckle as close to the center of gravity as possible while ensuring that the knuckle is slightly forward of the center of gravity, the load is spread evenly and the container can be dumped gently. The knuckle is so designed that it can be incorporated in a newly constructed chassis or inserted as a modification to an existing rigid chassis.

The chassis 22 is, for the most part, formed of welded together beams 26 and cross members 28, with fixing pins 36, 44 being provided at the corners of the bed defined by the chassis for receipt of the shipping container, these pins extending upwardly into reinforced openings at the corners of the shipping container, whereby the shipping container remains horizontally fixed on the chassis. The pins can be of a twist-to-lock type, having an elongated (e.g., elliptical) cross-section at a distal end and a round cross-section at a proximal end, being insertable in a complementary elongated hole in the container. When twisted the pins 36, 44 thus lock the container in place against vertical or horizontal displacement on chassis 22. The front pins 36 need not be retractable but must be arranged to release the container (e.g., twistable to unlock) to allow chassis 22 to tilt.

The chassis can be arranged in plan view to match the dimensions of the discrete shipping container. Alternatively, it is possible to space the two elongated beams 26 of the chassis more closely than the width of the container. In that case, the cross-members 28 can be provided with elongated arm sections 46 at the front and rear, carrying the locking pins 36, 44, respectively, which engage in corresponding openings in the container 110 (shown in FIGS. 3-8).

Shipping container 110 has reinforced corner structures 112, the corner structures being box-like structures welded directly to the structural members of container 110 and defining openings in the various different directions (front, side, bottom or top) which can be engaged by appropriate handling equipment. For example, the reinforced corners can be engaged by horizontally-oriented engagement pins, or in connection with the present invention, by vertical engagement pins 36, 44. In each case, the pins restrict the container 110 from moving in any direction perpendicular to the axis of the pin. The intermodal shipping type box container 110 as shown normally has reinforced engageable structures at all eight corners. Other containers are also fully applicable to the invention, the intermodal box type being shown as an example. Only the engageable structures at the lowermost corners are needed according to the present invention. These structures 112 are provided for engaging vertically-oriented pins 36, 44 in the reinforced corners 112 of container 110, and when the chassis sections 30, 40 are inclined around central knuckle 24. The front pins are automatically withdrawn from the container when the chassis is tilted, the container staying with the aft section. Should the aft section pins have been retracted below the bottom of the container (by controllable e.g., pneumatic means provided for this purpose), the container will slide off chassis 22.

Chassis 22 has a number of features common to conventional trailer chassis, and several particular features which are not common to conventional trailer chassis. Like a conventional container carrying chassis, chassis 22 is a framework in turn carried on a ground-engaging means such as wheels 42. For temporarily supporting the container chassis apart from support on the tractor via king pin assembly 32, retractable feet 34 are arranged on the fore section. User can extend feet 34 and thereby support the container chassis such that the tractor 50 can be driven in and out of engagement with the container chassis via the king pin assembly 32. King pin assembly 32 is adapted to engage on a vertical king pin (see FIG. 10) carried on the rear deck of the tractor 50, adjacent the tractor rear wheels 52. Inasmuch as the fore section 30 of the chassis must be arranged to incline upwardly away from the king pin when the fore and aft sections 30, 40 are tilted around knuckle 24, it is necessary to accommodate this misalignment of the fore section 30 relative to the king pin receiving plate on the rear deck of tractor 50's chassis. Accordingly, the invention provides a pivotably mounted king pin assembly 32 wherein the male portion of the king pin assembly (i.e., the part carried on the container chassis) is pivoted on a horizontal pivot disposed at the foremost edge of the chassis, whereby the king pin assembly 32 is pivotable downwardly from the fore section of the trailer as shown for example in FIGS. 2, 6 and 11, when the chassis sections 30, 40 is tilted around knuckle 24. In this manner, there is no stress on the king pin and moreover, the tractor and its attached container chassis can be driven about while inclined. This permits the driver to move the chassis 22 out from under the container 110 for unloading and also to move the chassis 22 toward and under container 110 to re-load.

When tilted, the mounts for the rear wheels of chassis 22 are inclined together with the remainder of the rear section of the chassis 22. In other words, the rearmost axle 62 carries the weight of the whole container chassis and any container thereon, and the second axle and wheels, placed slightly ahead of the rearmost axle 62, become raised off the ground due to the tilt. Both axles are disposed at a space below a horizontal line common with knuckle 24. A winch 68 forceably retracts a cable 66 attached by means of a block and sheave arrangement between the rear axles and a point on the forward section 30 of the chassis 22. Accordingly, the winch shortens the line between the rear axle and the front section 30, whereupon chassis 22 assumes an inclined position as shown in FIG. 2. Knuckle 24 is arranged such that surfaces of front section 30 and rear section 40 abut one another at full tilt.

The winch 68 can be electric or hydraulic. A retractable hydraulic cylinder or pair of cylinders can be used as well.

Figure 10:
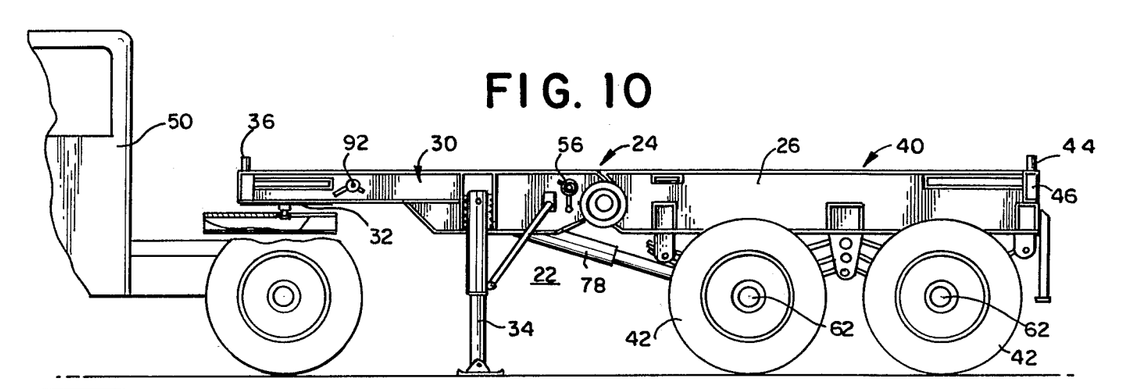
FIG. 10 is a side elevation showing an alternative embodiment including a hydraulic ram "wet line" system.
Figure 11:
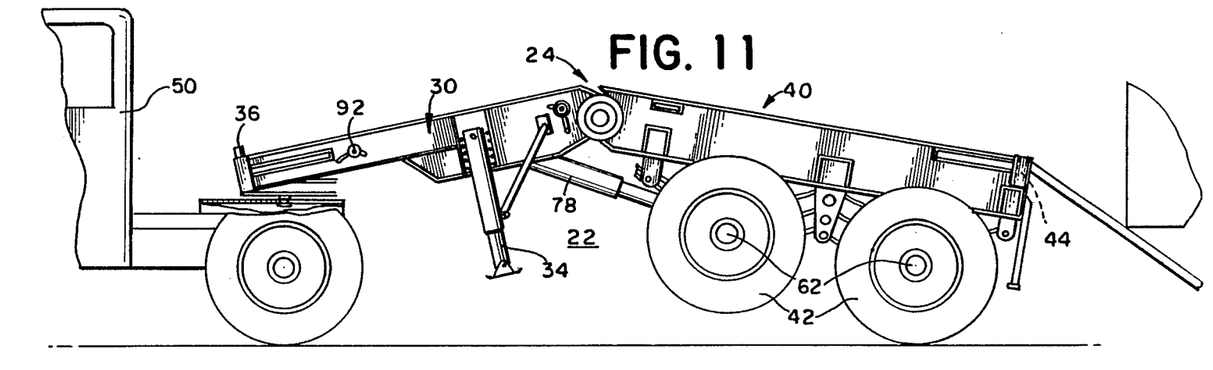
FIG. 11 is a side elevation showing the embodiment of FIG. 10 in a reloading configuration.

Preferably, a plurality of controllable locking pins are provided to fix relatively movable parts together when the load/unload/dump capabilities are not in use. Pneumatically controlled devices 56, 92 with manually operable valves driving air cylinders to advance shear pins through aligned parts prevent any displacement or inclination of the respective movable parts, namely displacement between the front and rear chassis sections 30, 40 or between the movable king pin assembly 32 and the front section 30 of the chassis 22. Examples of such locking pins 56, 92 are shown in FIGS. 10 and 11. A user-controlled switch which may be placed in the tractor cab, at a convenient control location or in the immediate vicinity of the pin being controlled, electrically or mechanically operating a valve leading to a pneumatic cylinder that need only have a short stroke but is operative to advance or retract a blocking shear pin that extends through and fixes together the parts to be blocked. For example, a pin is provided running horizontally through the fore section 30 of the chassis 22 and the pivotably king pin assembly 32, and also through facing portions of the fore and aft sections 30, 40 adjacent knuckle 24, which portions are bored to align when the trailer is to be fixed in a horizontal orientation.

The shear pins 56, 92 can be arranged to remain retracted against the bias of a spring. Alternatively, it is possible to arrange the shear pins 56, 92 to be driven pneumatically in both directions for insertion (fixing) and retraction (release), whereby the user's attention is required both to retract the pins and to re-insert them. Another possibility is a timed arrangement, wherein the pins remain retracted for a predetermined time period, after which the pins automatically advance to lock the trailer in its current position. It is possible to lock the trailer fore and aft sections 30, 40 and/or the pivotable king pin assembly 32 at a plurality of predetermined positions including not only the non-inclined position, but also one or more inclined positions. It is normally adequate to simply provide for locking the trailer parts when non-inclined. Due to the positive stop at the maximum angle of incline due to the stop plates of knuckle 24, the inclined chassis 22 is substantially rigid.

Figure 9:
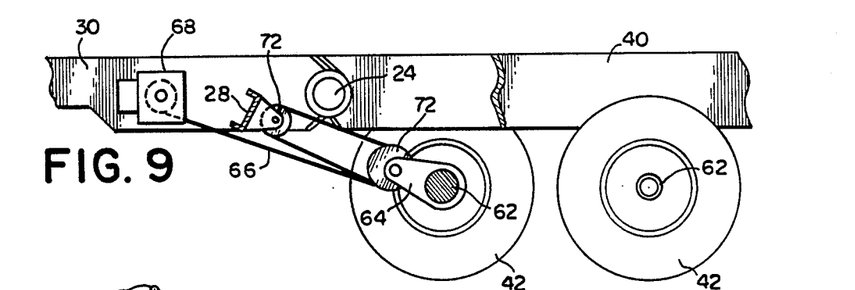
FIG. 9 is a partial section view along the longitudinal axis of the chassis, showing the winch.

The attachment between winch 68 and its cable 66 between the front chassis section 30 and the rear axle 62 is shown in FIG. 9. A plurality of opposed sheaves (pulleys) are provided on the wheel axle (i.e., on rear section 40) and on a crossmember of the front section e.g., adjacent winch 68, whereby the winch 68, using this block and tackle arrangement for cable 66, obtains a mechanical advantage. In any event, the winch motor 68 is mounted to at least one of the structural beams 26 or cross members 28 of the front chassis section 30. The cable 66 extending therefrom is attached to a sheave on rear axle 62, i.e., a point on rear section 40 spaced below the horizontal level of the knuckle 24, by means of a plurality of yokes 64 that extend directly around one of the rear axles 62 (preferably the front one) and provide a point of attachment for cable 66. Preferably, a pair of Crosby blocks and eight inch sheaves are used. The cable winds around appropriate sheaves 72 in a plurality of passes, for example 7 passes, sufficient to enable an eight thousand pound lift as needed to cause the already-supported container to become inclined to the required fifteen to thirty degrees.

The cable is preferably a half inch diameter steel stranded cable rated for more than the expected load of 8,000 pounds. A fully loaded rig can legally weigh 73,000 pounds, of which 26,000 pounds or so is due to the tractor and trailer. The net weight of container 110 and its contents is distributed among the passes of cable 66, wherefore the suggested 8,000 pound line pull winch and corresponding cable rating can support a tension of some 56,000 pounds. The inclined front and rear chassis sections 30, 40 provide some leverage against the vertical component of the weight such that the capacity of the unit is more than adequate. If desired, the capacity can be increased. A thicker cable and more powerful winch, for example a hydraulic winch, and/or more passes of cable 66, will increase the capacity. Preferably the cable 66 passes 7 to 10 wraps with an electric winch, the linear pull as multiplied via the block and sheaves ranging from about 48,000 to 68,000 pounds.

An alternative embodiment, shown in FIGS. 10 and 11, has one or two retracting hydraulic rams in place of the winch and cable. Preferably, a pair of rams, for example six inch diameter rams, with two inch rods, are mounted between the front 30 and rear 40 of chassis 22, the rear connection being at one of the axles 62. Using a pair of rams provides good stability. The rams are quite powerful and can incline the sections 30, 40 without special means for improving leverage.

Figure 5:
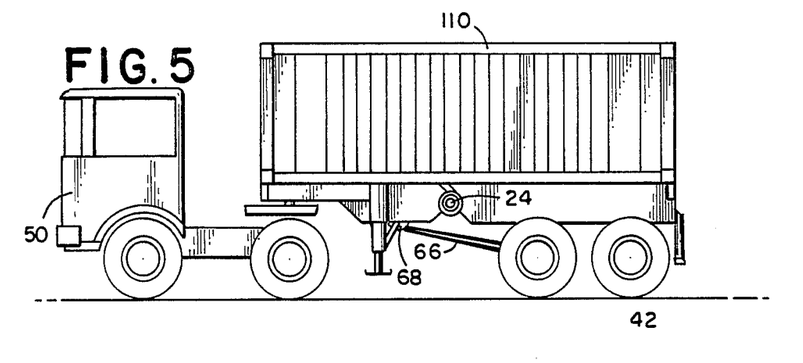
FIG. 5 is a side elevation view showing the chassis in its transporting condition.

In dumping the container 110, or when inclining the container such that it can be loaded with contents from the front, the user simply retracts cable 66 (or hydraulic ram 78) until the required tilt is reached. In releasing the container itself, the chassis and container follow steps detailed in FIGS. 5–7. In FIG. 5, the fore and aft trailer sections 30, 40 and the pivotable king pin assembly 32 all are in alignment, preferably locked in place by means of the locking pins pneumatically driven into aligned receptacles between parts which, when un-pinned, can become misaligned.

Figure 6:
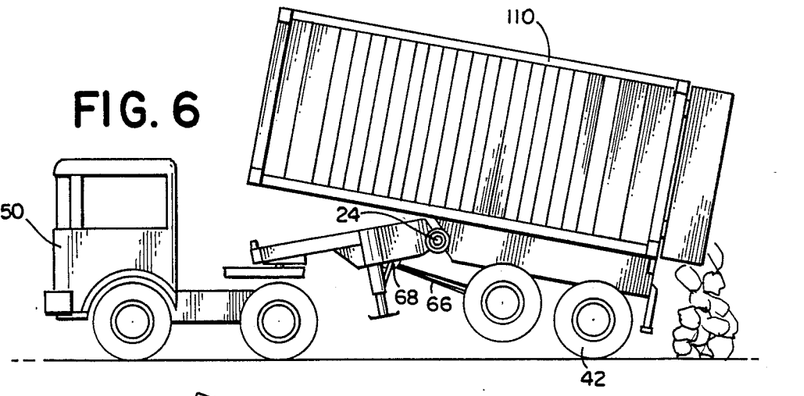
FIG. 6 is a side elevation view showing dumping, the shipping container being fixed to the aft chassis section.

As shown in FIG. 6, the fore and aft sections have been inclined around knuckle 24 by shortening the distance between the rear axle 62 and the front section 30 of the chassis 22, by means of the winch 68 or by means of ram 78. In so doing, the fore section 30 is inclined upwardly from horizontal toward knuckle 24, as is the rear section 40. The fore section 30 adjacent king pin assembly 32 is therefore also required to incline. The knuckle 24 being located forward of the center of gravity of the container, the container remains stable and is carried along with the rear chassis section 22. The container contents can thus be dumped from any doors on the back thereof, in the manner of a dump truck. Inherently, due to the relative inclination of the front and rear chassis sections 30, 40, the front container-engaging positioning pins 36 become retracted from their receptacles 112 in container 110, and when the trailer sections 30, 40 are brought again into alignment in a co-linear fashion, the front pins are inserted again, inherently by virtue of the chassis structure, into the reinforced corners 112 of the shipping container 110.

The rear container-positioning pins 44 are retractable. When the invention is positioned in its non-inclined orientation (FIG. 5), the user operates a manual or mechanical control to retract the rear pins 44 into the area of chassis 22, below the uppermost level of the aft chassis section 40. Accordingly, the trailer is then horizontally retained only by the two front pins 36. When inclining the fore and aft sections 30, 40 as shown in FIG. 6, the front pins become disengaged from the container and the container then lacks horizontal positioning support, and will slide freely off the back. Guide means in the form of raised flanges on each lateral side of chassis 22 keep container 110 aligned to chassis 22 as container 110 slides rearwardly due to gravity.

Figure 7:
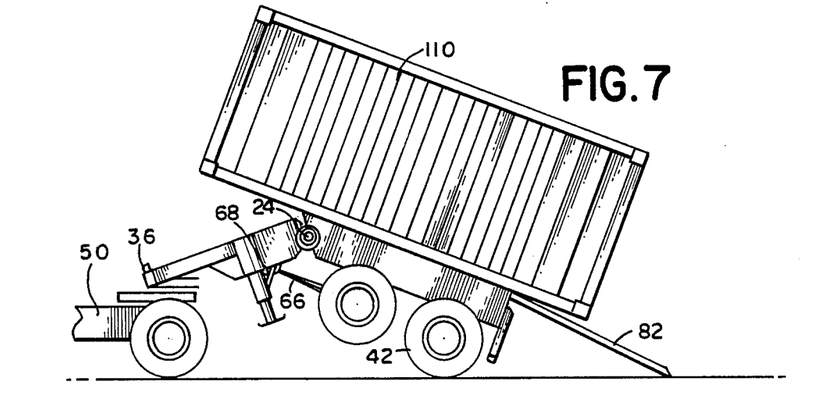
FIG. 7 is an elevation view with the container itself being removed, the aft fixing pins having been retracted.

As shown in FIG. 7, some sturdy retractable temporary ramps 82 can be stored in an opening 35 in the rear section of the chassis and pulled out to provide a planar slide path guiding the container 110 as it slides further, off the rearmost chassis section 40 and toward the ground. This is easily arranged by providing the front end of the ramps 82 with downwardly-turned flanged edges that engage in the rear container section 40 via horizontal slots 84 in the rearmost crossmember 46.

In order to ensure that the container 110 does not slide laterally off the chassis when the rear fixing pins 44 are retracted and tilting causes the front fixing pins 36 to come free, the guide means can include an upturned flange defined all along the lateral edges of chassis 22. Shorter guide flanges can be placed on other outer structures (e.g., the ends of arms 28, 46). Guide rims or flanges are recommended at least on rear chassis section 40 and/or ramps 82, whereby the container will remain longitudinally aligned with the chassis during the dumping, unloading or reloading processes.

Figure 8:
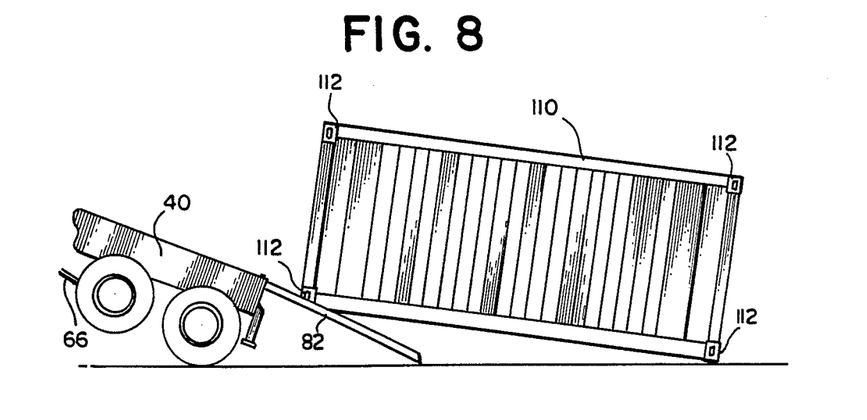
FIG. 8 is a side elevation view demonstrating the last stages of unloading the container (or first stages of reloading), the vehicle being driven out from under the container.

In FIGS. 6 and 7 the chassis sections 30, 40 are tilted to the maximum allowed by abutting plates of sections 30, 40 under knuckle 24. Therefore the chassis 22 is relatively rigid and when the rear edge of the container 110 reaches the ground, the tractor and container chassis can be driven out from under the container as shown in FIG. 8. This is possible in part because king pin frame 32 prevents tilting of the tractor 50 or undue stress on the king pin due to tilting.

The same drive-under procedure can be followed in reverse in order to bring the container 110 back onto the chassis 22 after it has been placed. The chassis 22 is first brought into its inclined position as shown in FIG. 2. The trailer is then backed up to the container and the ramps 82 are installed such that the container 110 is at the bottom of the ramps 82 and aligned to the chassis 22. A second winch or the like, in addition to the winch 68 which is maintaining the chassis in an inclined position, is engaged and allowed to tension a line attached, for example, to the two front reinforced container corners 112 as shown in FIG. 11. The second winch pulls the container just enough to keep the container 110 from being pushed back as the driver backs the rig, moving ramps 82 and chassis 22 under container 110. When the container is in place on the ramps 82, the second winch 98 pulls the container forward somewhat further (5 to 8 feet), whereupon the container clears the ramps 82 and rear fixing pins 44 are raised.

Once the container is resting on the rear chassis section and has been pulled forwardly into position for the reinforced corners 112 of the container to align with the fixing pins 44 of the chassis, it inherently is in position to engage front pins 36. Second winch 98 can more easily pull container 110 forward when the chassis 22 is not in its fully-inclined position. Accordingly, the front and rear chassis sections can be brought back nearly (but not fully) into alignment prior to raising pins 44.

As a result of the foregoing structures, the invention is able to load, unload or dump the contents of containers in various standard lengths and types. One major benefit of the invention is that no special hydraulic systems are necessarily required. Accordingly, the invention is much less expensive than known full size dumping apparatus, and brings the benefits of dumping capabilities to small scale operators. The invention is likewise operable with hydraulic means. For example, a hydraulically-powered winch can be employed for tilting the chassis sections relative to one another or a force-exerting ram 78 with a piston and cylinder arrangement can be employed instead of the winch arrangement for drawing the front and rear sections closer to one another around their hinge knuckle 24.

The knuckle 24 being simply installed between otherwise co-linear sections 30, 40, and the winch 68 being engaged between any point on the front section 30 and the rear axle 62, the invention can be arranged as a retrofit of any existing chassis. One simply cuts the co-linear beam elements along the chassis 22, installs the knuckle 24 and winch 68, and, if the container is to be entirely releasable from the chassis, arranges for controllable retraction of the rear fixing pins 44.

In addition to embodiments of the invention employing a tractor and container chassis in an articulated configuration, the invention is likewise operable in connection with rigid trucks, having a cab section attached to the same chassis and not articulated thereto. In that event, the front chassis section 30 is deemed to include the cab and driver. The chassis when inclined causes the central portion adjacent knuckle 24 to bow upwardly, whereupon the cab section becomes inclined downwardly toward the ground, lacking a pivotable king pin assembly. The load is thus carried on the front wheels of the truck. It is advisable to align the wheels straight in this maneuver, to prevent the load from affecting the wheel alignment.

A number of other variations will now be apparent to persons skilled in the art. Reference should be made to the appended claims rather than the foregoing specification as indicating the true scope of the invention.

The invention as disclosed herein is a vehicle for transporting a container 110, comprising a chassis 22 carried on at least one ground engaging means 52 supporting the chassis 22 above a ground surface and spacing an upper surface of the chassis 22 above said ground surface, said upper surface of the chassis being contoured to complement a lower surface of the container 110 when the container is placed on the chassis 22, the chassis 22 having a rigid fore section 30 and a rigid aft section 40, the fore and aft sections 30, 40 being normally aligned co-linearly and being articulated to one another at a knuckle 24 defining a horizontal articulation axis, the knuckle 24 being free to pivot only in a direction causing the fore and aft sections 30, 40 to become inclined downwardly from the knuckle 24. Means 36, 44 at least temporarily fix the container to the aft section 40 of the chassis 22. Articulation drive means 68, 66 attached to the fore section 30 and to the aft section 40 at point 62 spaced from the articulation axis of the knuckle 24 are controllably operable to force the fore and aft sections 30, 40 of the chassis 22 to pivot around the knuckle 24, thereby lifting the knuckle 24 and tilting the container 110 aft.

The chassis 22 can be part of a trailer 22 and tractor 50 articulated combination, the tractor 50 and trailer chassis 22 being articulated to one another at a substantially vertical king pin and the container 110 being a discrete standardized container 110 freely removable from the trailer 22.

The ground engaging means can include at least one pair of wheels 52 on an axle 62 disposed on the aft section 40 below the articulation axis of the knuckle 24 and the articulation drive means 68 is connected to exert a force between the fore section 30 and the aft section 40 adjacent said axle 62.

The articulation drive means can include a winch 68 with a reel mounted to one of the fore section 30 and the aft section 40 and a line 66 wound on the reel, the line being fixed to the other of said fore section and said aft section, the winch 68 shortening the line between the fore section and the aft section to tilt the container 110.

The chassis 22 can further comprise a king pin assembly 32, pivotally attached to the fore section 30 at a horizontal pivot axis, the king pin assembly 32 being pivotable from the fore section 30 at least up to an angle of maximum inclination of the fore section relative to horizontal, the king pin assembly 32 being fixed to the tractor 50 during tilting of the container 110.

The device preferably also includes movable locking pins 56 for fixing the fore and aft sections 30, 40 rigidly together when aligned co-linearly. The chassis can be a truck bed and the container a discrete intermodal shipping container 110 freely removable from the truck bed.

A plurality of fixing pins 36, 44, preferably protrude from the upper surface of the chassis 22, the container 110 having openings for mating with the fixing pins 36, 44 on the chassis 22, thereby fixing the container 110 at least temporarily against horizontal displacement relative to the chassis 22.

The fixing pins can include front fixing pins 36, on the fore section 30 and rear fixing pins 44 on the aft section 40, and further comprising controllable means for retracting said rear fixing pins 44 into the chassis, the articulation axis of the knuckle 24 being located closer to a front of the chassis 22, than a center of gravity of the container 110, the knuckle 24 being pivotable to an angle sufficient to raise the container 110 from the front fixing pins 36.

At least one ramp and preferably two ramps 82 are temporarily attachable on a rear 84 of the aft section 40, for guiding the container 110 as the container 110 slides from the aft section 40 of the chassis 22.

The invention is also directed to a chassis for transporting a container 110 in connection with a tractor 50 articulated to the trailer 22 at a king pin assembly 32, the trailer 22 comprising: a chassis having a fore section 30 and an aft section 40, the aft section 40 having ground engaging wheels 52 carried on an axle 62, the fore and aft sections 30, 40 being pivotable around a knuckle 24 connecting the fore section 30 to the aft section 40, the fore section 30 and the aft section 40 having complementary abutments disposed substantially radially to an axis of the knuckle 24, whereby the knuckle is pivotable only in a direction in which the fore section 30 and aft section 40 tilt away from the knuckle 24, and the chassis 22 being locked in an opposite direction. The chassis 22 can have a plurality of fixing pins 36, 44 and the container 110 has vertical receptacles 112 for mating with the pins 36, 44, whereby the container 110 can be placed on the chassis 22 and fixed against horizontal displacement thereon. The fore section 30 and the aft section 40 are connected by a force-exerting means 68 connected to the fore section 30 and the aft section 40 at least at one point spaced from a plane occcupied by the knuckle 24, the force exerting means 68 being operable to pivot the fore section 30 and the aft section 40 around the knuckle 24 thereby tilting the container 110.

The container rests vertically on the pins 36, 44 and the knuckle 24 is disposed forward of the center of gravity of the container 110, whereupon during tilting of the container the container tilts rearwardly with the aft section 40.

The container 110 can have an openable rear wall, whereby the contents of the container are dumped upon tilting the fore and aft sections 30, 40 around the knuckle 24. The fixing pins on the rear section can be retracted by suitable means, whereby the container itself is also released and unloaded upon tilting. The force exerting means preferably includes a winch 68. The force exerting means can include a hydraulic cylinder. A pivotable king pin frame assembly 90 is pivotably disposed on the fore section 30 and pivotable free of the fore section 30 to remain engaged to the tractor 50 during tilting of the fore and aft sections 30, 40.

What is claimed is:

1. A vehicle for transporting a removable container, comprising:

a trailer chassis carried on at least one ground engaging means supporting the chassis above a ground surface and spacing an upper surface of the chassis above said ground surface, said upper surface of the chassis being contoured to complement a lower surface of the container when the container is placed on the chassis, the chassis having a rigid fore section and a rigid aft section, the fore section being connectable to a tractor by a king pin defining a substantially vertical articulation axis between the tractor and the vehicle, the fore and aft sections being normally aligned co-linearly with both said fore section and said aft section directly bearing the container thereon, said fore and aft sections being articulated to one another at a knuckle defining a horizontal articulation axis between said fore and aft sections, the knuckle being free to pivot only in a direction causing the fore and aft sections to become inclined downwardly from the knuckle;

means for at least temporarily fixing the container to the aft section of the chassis; and, articulation drive means attached to the fore section and to the aft section at points spaced from the articulation axis of the knuckle, the articulation drive means being controllably operable to force the fore and aft sections to pivot around the knuckle, thereby lifting the knuckle relative to the fore and aft sections and tilting the container aft, said articulation drive means including a winch with a reel mounted to one of the fore section and the aft section and a line wound on the reel, the line being fixed to the other of said fore section and said aft section, the winch shortening the line between the fore section and the aft section to tilt the container.

2. The vehicle of claim 1, further comprising a pair of ramps temporarily attachable on a rear of the aft section, at least one of the aft section and the ramps defining lateral guide flanges for guiding the container as the container slides along the aft section of the chassis.

3. A trailer for transporting a discrete shipping container in connection with a tractor/trailer configuration in which the tractor is articulated to the trailer at a king pin assembly such that the tractor and trailer are pivotable around a vertical axis defined by the king pin assembly and the trailer is supported at a front end thereof on the tractor, the trailer comprising:

a chassis having a fore section and an aft section, the fore and aft sections being rigid and being alignable co-linearly to directly carry the shipping container on upper surfaces of both the fore section and the aft section, the aft section having ground engaging wheels carried on an axle, the fore and aft sections being pivotable around a knuckle connecting the fore section to the aft section, the fore section and the aft section having complementary abutments spaced substantially radially to an axis of the knuckle, such that the knuckle is pivotable only in a direction in which the fore and aft sections tilt downwardly away from the knuckle, the complementary abutments coming into contact to stop the pivoting of the fore and aft sections upwardly from the knuckle, and defining a maximum tilt angle of the fore and aft sections relative to one another, the chassis having a plurality of fixing pins and the container having vertical receptacles for mating with the pins, whereby the container can be placed on the chassis and fixed at least temporarily against horizontal displacement thereon; and, the fore section and the aft section being connected by a force exerting winch connected by a line extending between the fore section and the aft section at least at points spaced from the knuckle, the winch being operable to pivot the fore section and the aft section around the knuckle by drawing together the fore section and the aft section, thereby tilting the container up to the maximum tilt angle, at which the complementary abutments come into contact to lock the trailer in a stable tilted arrangement.

4. The trailer of claim 3, wherein the the knuckle is disposed forward of a center of gravity of the container, such that the container tilts rearwardly with the aft section due to gravity, when the fore and aft sections are drawn together.

5. The trailer of claim 4, wherein the container has an openable rear wall, whereby the contents of the container are dumped upon tilting the fore and aft sections around the knuckle.

6. The trailer of claim 3, further comprising means for retracting the fixing pins on the aft section independent of the fixing pins on the fore section, whereby the container is released upon tilting of the fore and aft sections.

7. The trailer of claim 3, wherein the force exerting winch is an electric winch.

8. The trailer of claim 7, further comprising a block and sheave cable connection for attaching the winch by a cable making a plurality of passes between the fore section and the aft section.

9. The trailer of claim 3, wherein the force exerting winch is hydraulic.

10. The trailer of claim 3, further comprising a pivotable king pin frame assembly pivotably disposed on the fore section and pivotable free of the fore section to remain engaged to the tractor during tilting of the fore and aft sections.

* * * * *